US012474031B2

(12) United States Patent
Gürtl

(10) Patent No.: US 12,474,031 B2
(45) Date of Patent: Nov. 18, 2025

(54) VEHICLE SENSING AND/OR LIGHTING UNIT FOR A VEHICLE

(71) Applicant: ZKW Group GmbH, Wieselburg (AT)

(72) Inventor: Josef Gürtl, Kilb (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/979,160

(22) Filed: Dec. 12, 2024

(65) Prior Publication Data

US 2025/0198592 A1   Jun. 19, 2025

(30) Foreign Application Priority Data

Dec. 15, 2023   (EP) ..................... 23217223

(51) Int. Cl.
*F21S 45/60* (2018.01)

(52) U.S. Cl.
CPC ..................... *F21S 45/60* (2018.01)

(58) Field of Classification Search
CPC ....................................................... F21S 45/60
See application file for complete search history.

(56) References Cited

U.S. PATENT DOCUMENTS

| 2013/0114279 A1 | 5/2013 | Marley |
| 2017/0313235 A1 | 11/2017 | Faoucher et al. |

FOREIGN PATENT DOCUMENTS

| DE | 102020124774 A1 | 3/2022 | |
| JP | 2007299676 A | 11/2001 | |
| JP | 2008103086 A | 5/2008 | |
| JP | 2010021121 A * | 1/2010 | ............ F21S 48/34 |
| JP | 2023169096 A | 11/2023 | |
| KR | 20230156982 A | 11/2023 | |

OTHER PUBLICATIONS

Extended European Search Report for European Patent Application No. 23217223.9 dated Apr. 4, 2024 (9 Pages).

* cited by examiner

*Primary Examiner* — Sean P Gramling
(74) *Attorney, Agent, or Firm* — Eversheds Sutherland (US) LLP

(57) ABSTRACT

A vehicle unit, e.g., a vehicle headlamp, includes a cover lens formed of at least partially translucent material; a holder holding the cover lens; a heating wire embedded within the cover lens configured to heat the cover lens; and a connector for connecting the heating wire to a power source. The cover lens includes an operating section, for operable units (e.g., light modules) of the vehicle unit to engage with an environment outside of the vehicle unit, and a connecting section for mounting the cover lens onto the holder. The connecting section is substantially not visible to an outside observer of the vehicle unit. The heating wire is arranged in the operating and connecting sections. The cover lens includes a heat distributing element on the heating wire arranged to distribute heat homogenously over the connecting section to avoid hot spots in the heat distribution over the cover lens.

16 Claims, 2 Drawing Sheets

VEHICLE SENSING AND/OR LIGHTING UNIT FOR A VEHICLE

CROSS-REFERENCE TO RELATED APPLICATIONS

This application claims priority to European Patent Application No. 23217223, filed Dec. 15, 2023, which is incorporated herein by reference.

TECHNICAL FIELD

The invention relates to a vehicle unit for a vehicle, in particular a vehicle sensing and/or lighting unit, more preferably a vehicle headlamp, wherein the vehicle unit comprises:
- a cover lens formed of an at least partially translucent material, wherein the cover lens comprises
- an operating section for operable units of the vehicle unit to engage with an environment outside of the vehicle headlamp, for example a light module for illuminating the exterior in front of the vehicle unit,
- a connecting section,
- a holder for holding the cover lens, wherein cover lens is mounted on the holder in a way that the connecting section of the cover lens is substantially not visible for an outside observer of the vehicle headlamp,
- a heating wire embedded within the cover lens and is configured to heat the cover lens, wherein the heating wire is arranged in the operating section and the connecting section,
- a connector for connecting the heating wire with a power source,
- wherein the connecting section is configured for electronically connecting the heating wire to the connector.

The invention further relates to a vehicle comprising at least one vehicle unit according to the invention.

BACKGROUND

Vehicle units with cover lenses including a heating wire are known in the state of the art. Typically cover lenses of vehicle units are installed in a vehicle in such a way that one side of the cover lens is in contact with the surrounding air outside of the vehicle.

Especially during cold seasons, freezing of water or condensation on the cover lens should be avoided to ensure optimal light output and light distribution of the automotive headlight. For this purpose, a heating wire is embedded in the cover lens to prevent the mentioned freezing. Now, during cold seasons, due to the driving wind, the heating wire is operated at a higher power level while driving. This results in areas not exposed to the driving wind not cooling down as drastically, creating a hot spot in these areas on the cover lens. This hot spot could, for example, lead to errors in the attachment of the closing plate to the holder. Therefore, it is desired to avoid such a hot spot in the closing plate while operating the heating wire and to enable even heat distribution on the cover plate.

SUMMARY OF THE INVENTION

It is an object of the invention to provide enhanced vehicle units for vehicles.

To achieve this object, the cover lens includes a heat distributing element, which is applied on the heating wire, preferably only on the heating wire, arranged in the connecting section in order to distribute heat in a homogenous way over the connecting section in order to avoid heat hot spots in the heat distribution over the cover lens.

In this way, thermal hotspots can be avoided, which potentially destroy a plastic material of the cover lens, since no temperature regulating airflow is in contact with this extending connection section.

As mentioned in the beginning, the connection section is not exposed to air outside of the vehicle unit.

Advantageously, the operable unit is a sensor or a light module, preferably a Radar and/or a Lidar sensor.

Advantageously, the cover lens is built by over-molding the heating wire and the heat distributing element by plastic material. In that way the heating wire and the heat distributing element, preferably also a carrier substrate, are embedded within the cover lens. In that way, the heat distributing element can be to be protected and mechanically stabilized.

Advantageously, the heat distributing element is arranged on one side of the heating wire or both sides of the heating wire.

Advantageously, as mentioned above, the vehicle headlamp in a correct installed state on a vehicle is exposed to surrounding air of the vehicle.

Advantageously, the heat distributing element is built as a plate or a foil, preferably a metal plate or a metal foil.

Advantageously, the heat distributing element is built as a heat sink, which is attached to the heating wire in the connection section.

Advantageously, the metal is aluminum or copper.

Advantageously, the vehicle unit comprises a carrier substrate onto which the heating wire is mounted, wherein the heating wire and the carrier substrate are embedded within the cover lens.

Advantageously, the peripheral rim of the cover lens is the connecting section.

Advantageously, the heating wire and the carrier substrate are over molded with the at least partially translucent material to form the cover lens, preferably the material is plastic.

Advantageously, the heat distributing element is embedded within the cover lens.

Advantageously, the heating wire is coated with an insulated layer at least in the connecting section.

Advantageously, the insulating layer is built as resin.

Advantageously, the at least partially translucent material is plastic.

Advantageously, the connector is arranged on the connecting section of the cover lens.

Advantageously, the connection section is configured for connecting the cover lens onto the holder of the vehicle unit.

The object of the invention is also achieved by a vehicle comprising at least one vehicle unit according to the invention.

BRIEF DESCRIPTION OF THE FIGURES

In the following, in order to further demonstrate the present invention, illustrative and non-restrictive embodiments are discussed, as shown in the drawings.

DETAILED DESCRIPTION

Figure 1:
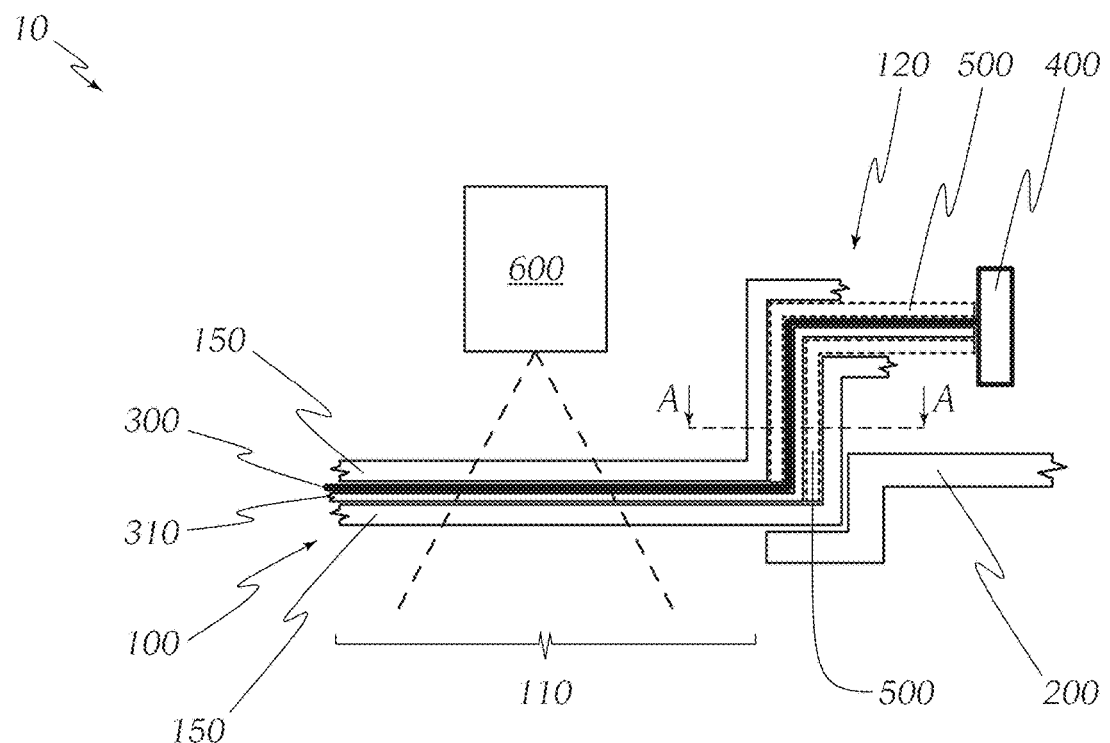
FIG. 1 shows a schematic example of a vehicle headlamp, comprising a cover lens, a holder for the cover lens and a light module as an operable unit.

FIG. 1 shows an example of a vehicle headlamp 10 for a vehicle, wherein the vehicle headlamp 10 comprises a cover lens 100 formed of an at least partially translucent material, which is in this example plastic.

The cover lens 100 has an operating section 110, for operable units of the vehicle headlamp 10 to engage with an environment outside of the vehicle headlamp 10. In the present example, the vehicle headlamp 10 comprises a light module 600 as an operable unit.

Further, the cover lens has a connecting section 120 for mounting the cover lens 100 onto a holder of the vehicle headlamp 10.

The vehicle headlamp 10 comprises a holder 200 for holding the cover lens 100, wherein cover lens 100 is mounted on the holder 200 in a way that the connecting section 120 of the cover lens is substantially not visible for an outside observer of the vehicle headlamp 10, as can be seen in FIG. 1.

Further, the vehicle headlamp 10 comprises a heating wire 300 and a carrier substrate 310 onto which the heating wire 300 is mounted, wherein the heating wire 300 and the carrier substrate 310 are embedded within the cover lens 100, wherein the heating wire 300 is configured to heat the cover lens 100, wherein the heating wire 300 is arranged in the operating section 110 and the connecting section 120.

The cover lens 100 is built by over-molding the heating wire 300 and the heat distributing element 500 by plastic material. The over-molded parts 150 of the plastic material can be seen for example in FIG. 2.

Further, the vehicle headlamp 10 comprises a connector 400 for connecting the heating wire 300 with a power source (not shown in the figures). The connector 400 is arranged on the connecting section 120 of the cover lens 100.

Moreover, the cover lens 100 comprises a heat distributing element 500, which is applied only on the heating wire 300 arranged in the connecting section 120 in order to distribute heat in a homogenous way over the connecting section 120 in order to avoid heat hot spots in the heat distribution over the cover lens 100. The heat distributing element 500 extends to the connector 400, as can be seen in FIG. 1.

The heat distributing element 500 is built as a metal foil in the shown example. However, it is possible that the heat distributing element 500 is built as a plate, preferably a metal plate. The metal of the metal foil is aluminum or copper. The heat distributing element 500 is adhered to the heating wire 300 and also embedded within the cover lens 100.

Figure 2:
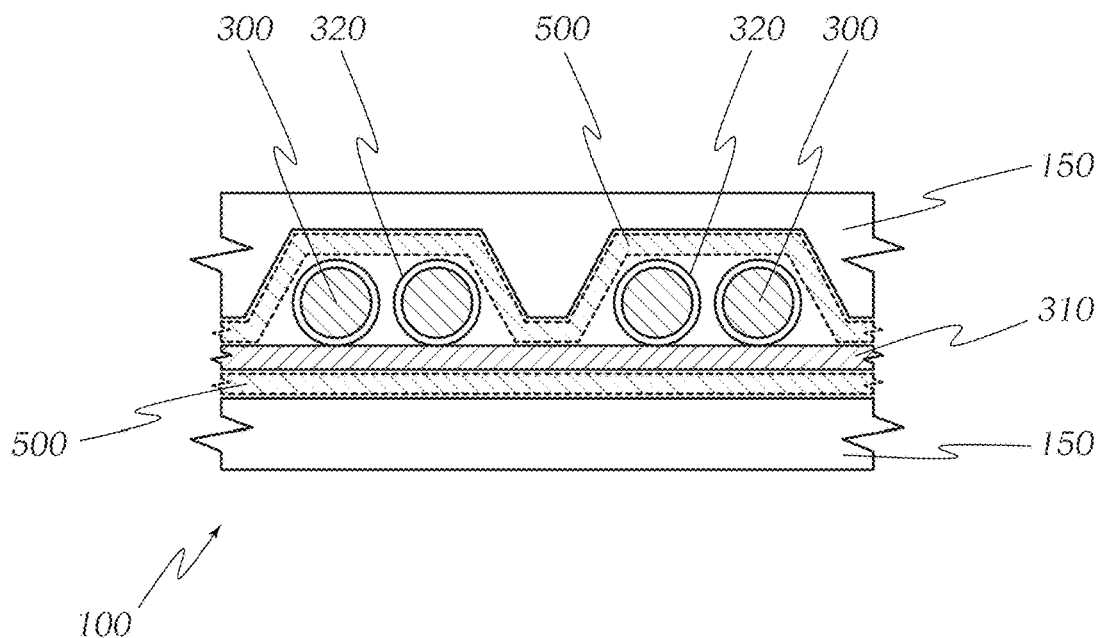
FIG. 2 shows a cross-section of the cover lens along line A-A in FIG. 1.

Further, the heating wire 300 is coated with an insulated layer 320 in the connecting section 120, as can be seen in FIG. 2. The insulating layer 320 is built as resin.

Further, as can be seen in FIG. 2, the heat distributing element 500 is arranged on both sides of the heating wire 300, meaning that the heat distributing element 500 is arranged in the side where the heating wire 300 is arranged and on the opposite side where the carrier substrate 310 is arranged.

Figure 3:
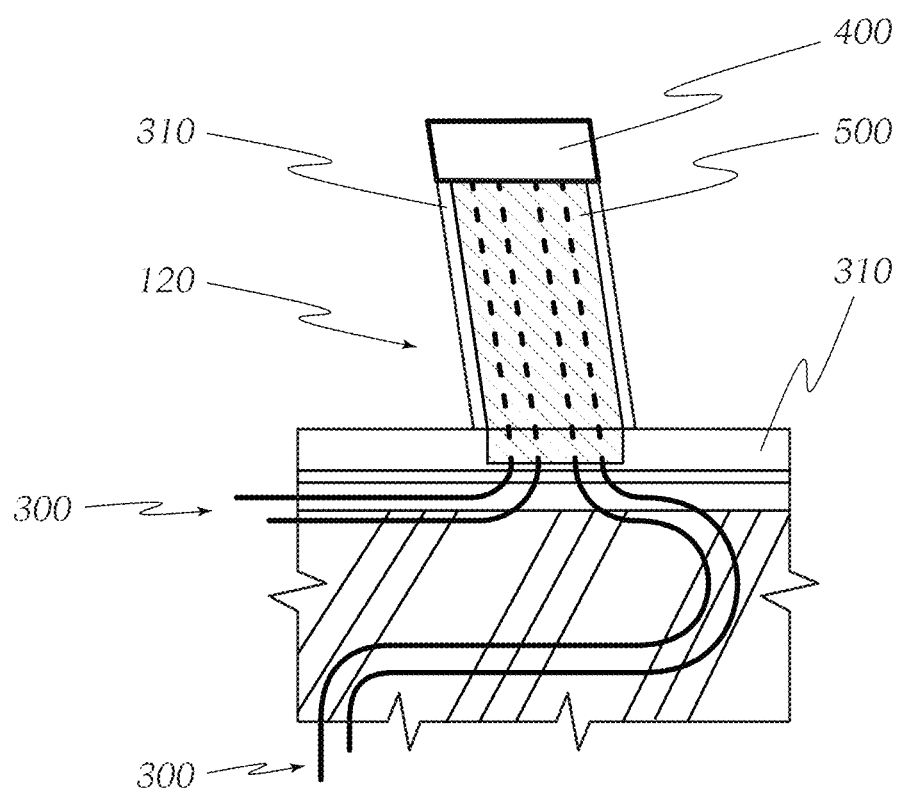
FIG. 3 shows a further example of a vehicle unit.

FIG. 3 shows a further example of a vehicle unit with the same features of the vehicle headlamp 10 of FIG. 1 and FIG. 2. The above to FIG. 1 and FIG. 2 applies to the features with the same reference signs in FIG. 3.

LIST OF REFERENCE SYMBOLS

Vehicle headlamp . . . 10
Cover lens . . . 100
Operating section . . . 110
Connecting section . . . 120
Over-molded parts . . . 150
Holder . . . 200
Heating wire . . . 300
Carrier substrate . . . 310
Insulated layer . . . 320
Connector . . . 400
Heat distributing element . . . 500
Operable unit . . . 600

That which is claimed is:

1. A vehicle unit (10) for a vehicle, in particular a vehicle sensing and/or lighting unit, the vehicle unit (10) comprising:
   a cover lens (100) formed of an at least partially translucent material, wherein the cover lens (100) comprises:
      an operating section (110), for operable units (600) of the vehicle unit (10) to engage with an environment outside of the vehicle unit (10), and
      a connecting section (120);
   a holder (200) for holding the cover lens (100), wherein the cover lens (100) is mounted on the holder (200) such that the connecting section (120) of the cover lens is substantially not visible for an outside observer of the vehicle unit (10);
   a heating wire (300) embedded within the cover lens (100) and configured to heat the cover lens (100), wherein the heating wire (300) is arranged in the operating section (110) and the connecting section (120); and
   a connector (400) for connecting the heating wire (300) to a power source,
   wherein the connecting section (120) is configured for electronically connecting the heating wire (300) to the connector (400),
   wherein the cover lens (100) comprises a heat distributing element (500), which is applied on the heating wire (300) arranged in the connecting section (120) in order to distribute heat in a homogenous way over the connecting section (120) in order to avoid heat hot spots in the heat distribution over the cover lens (100), and
   wherein the heat distributing element (500) is embedded within the cover lens (100).

2. The vehicle unit according to claim 1, wherein the cover lens (100) is built by over-molding the heating wire (300) and the heat distributing element (500) with a plastic material.

3. The vehicle unit according to claim 1, wherein the heat distributing element (500) is arranged on one side of the heating wire (300) or both sides of the heating wire (300).

4. The vehicle unit according to claim 1, wherein the heat distributing element (500) is configured as a metal plate or a metal foil.

5. The vehicle unit according to claim 4, wherein the metal is aluminum or copper.

6. The vehicle unit according to claim 1, wherein the vehicle unit (10) comprises a carrier substrate (310) onto which the heating wire (300) is mounted, wherein the heating wire (300) and the carrier substrate (310) are embedded within the cover lens (100).

7. The vehicle unit according to claim 1, wherein the heating wire (300) is coated with an insulated layer (320) at least in the connecting section (120).

8. The vehicle unit according to claim 7, wherein the insulating layer comprises a resin.

9. The vehicle unit according to claim 1, wherein the at least partially translucent material is plastic.

10. The vehicle unit according to claim 1, wherein the connector (400) is arranged on the connecting section (120) of the cover lens (100).

11. The vehicle unit according to claim 1, wherein the connection section (120) is configured for connecting the cover lens (100) onto the holder of the vehicle unit (10).

12. The vehicle unit according to claim 1, wherein the heat distributing element (500) is applied only on the heating wire (300).

13. The vehicle unit according to claim 1, wherein the operable units (600) comprise a light module.

14. The vehicle unit according to claim 1, wherein the vehicle unit is a vehicle headlamp.

15. A vehicle comprising at least one vehicle unit according to claim 1.

16. A vehicle comprising at least one vehicle unit according to claim 14.

* * * * *